R. A. CALDWELL.
ANGLE COCK VALVE.
APPLICATION FILED MAR. 12, 1914. RENEWED NOV. 28, 1916.

1,216,068.

Patented Feb. 13, 1917.

WITNESSES
Samuel E. Wade.
Myron J. Clear.

INVENTOR
Roy A. Caldwell
BY Munn & Co.
ATTORNEYS

UNITED STATES PATENT OFFICE.

ROY ALEXANDER CALDWELL, OF LOS ANGELES, CALIFORNIA.

ANGLE-COCK VALVE.

1,216,068. Specification of Letters Patent. Patented Feb. 13, 1917.

Application filed March 12, 1914, Serial No. 824,197. Renewed November 28, 1916. Serial No. 133,985.

*To all whom it may concern:*

Be it known that I, ROY A. CALDWELL, a citizen of the United States, and a resident of Los Angeles, in the county of Los Angeles and State of California, have made a new and useful Improvement in Angle-Cock Valves, of which the following is a specification.

My present invention relates generally to valves and more particularly to an angle cock valve, my object being to provide a simple, inexpensive construction, whereby the train line may be cut off and the pressure bled from the air hose in a simple and effective manner preparatory to uncoupling and removing the hose.

In carrying out my invention I preferably utilize the construction shown in the accompanying drawing, forming a part of this specification, and in which—

Referring now to these figures, the casing A of my improved angle cock is generally tubular in form, one end $a$ thereof being downwardly curved and internally threaded to receive one end of the hose B, and the opposite end being also internally threaded for the reception of one end of the train line C.

Intermediate its ends the casing A is provided with vertically alined and diametrically opposing openings, the walls of which openings are tapered slightly in order to receive the end portions of the valve sleeve D firmly seated therein, the lower one of the said casing openings being threaded at its lower portion to receive the threaded portion of a closing cap E having a central cavity $e$ for a purpose to be hereinafter described.

Figure 2:
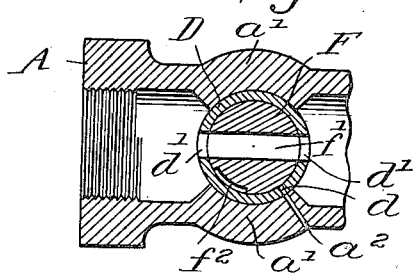
Fig. 2 is a horizontal section through a portion thereof illustrating the valve open.

The side portions $a'$ of the casing A contiguous to the valve sleeve D are thickened and formed to provide seats for the relatively opposite sides of the sleeve, one of these side portions $a'$, as best shown in Fig. 2, being provided with a bleed port $a^2$ extending therein and communicating with a small bleed port $d$ in the sleeve D, the latter being also provided with diametrically opposing slotted openings $d'$ communicating with the interior of the casing A upon relatively opposite sides of its portions $a'$.

In the sleeve D is seated a tapering plug F which forms the valve proper, and the upper end $f$ of which is squared to receive the apertured end of the usual curved valve handle G, the tapering body of the plug F being held in snugly fitted relation within its seat formed by the sleeve D by means of a coil spring H seated between the closing cap E and the lower enlarged end of the valve plug and disposed within the socket $e$ in the closing cap before mentioned.

Figure 1:
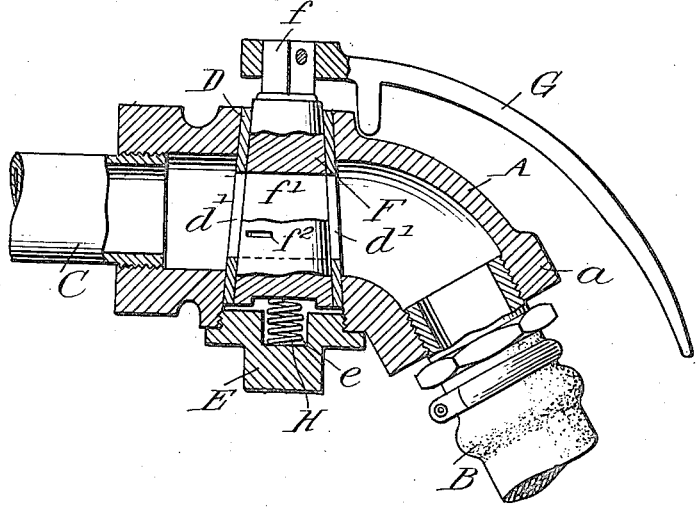
Figure 1 is a vertical longitudinal section through my improved valve.
Figure 3:
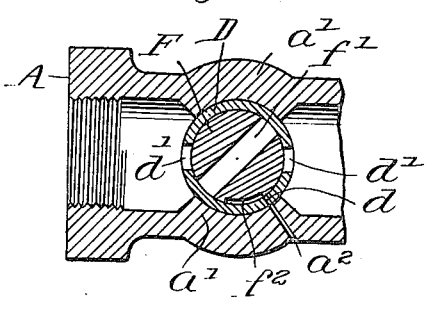
Fig. 3 is a similar view illustrating the valve closed with the bleeding recess in non-lapped position.

The valve plug F has a transverse slotted opening $f'$ constituting the main valve opening and adapted to register with the sleeve openings $d'$ in order to establish communication between the train line C and the hose B, this position being shown in Figs. 1 and 2. As usual, however, the valve plug is rotatable by means of the handle G to various positions in which its main opening $a'$ is out of registry with the sleeve openings $d'$, two of such positions being shown in Figs. 3 and 4.

The peripheral surface of the plug F is also provided with a horizontally slotted recess $f^2$ arranged in the same horizontal plane with the bleed openings $a^2$ and $d$, and of such length as that it may span the distance between the inner end of these bleed openings and the sleeve opening $d'$ nearest thereto, and which it will be seen is the sleeve opening leading toward the hose B.

Figure 4:
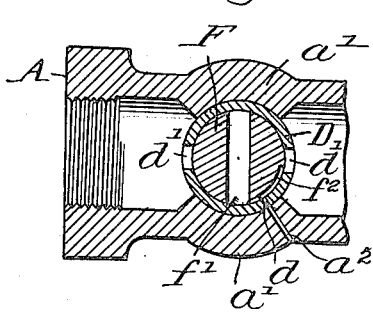
Fig. 4 is another similar view illustrating the valve in closed position with the bleeding recess in lapped position.

Thus with the plug F turned to the position shown in Fig. 4, recess $f^2$ laps the bleed openings and the adjacent sleeve opening $d'$ establishing communication between the interior of the hose and the atmosphere at a time when the train line C is entirely closed. In this manner pressure within the hose is gradually bled therefrom whereby to enable the hose to be quickly and easily detached without danger either to the parts of the hose, its couplings, or the operator.

I claim:—

In an angle cock, the combination with a tubular body having diametrically opposing apertures, a valve sleeve having its ends extended into the diametrically opposing apertures of the body, said sleeve and said apertures being correspondingly tapered, a closing cap threaded into the enlarged opening of the casing and provided with an inner central socket, a plug disposed within the sleeve and also tapered to correspond to the taper thereof, said plug and said sleeve having slotted transverse openings of substantially smaller dimensions than the bore of the body and adapted to register to establish communication between the ends of the body and said body and said sleeve having laterally extending bleed openings adjacent to one of the said slotted openings of the sleeve, a spring seated in the cavity of the closing cap and bearing against the enlarged end of the valve plug in order to snugly seat the same within the sleeve, the said valve plug having a horizontally slotted recess in its peripheral surface between opposite ends of the plug opening to lap the inner ends of the bleed openings with one of the said adjacent slotted openings of the sleeve when the main valve opening is turned to a non-registered position in which its slot extends at right angles to the axis of the body, and a handle for turning the valve plug, all for the purpose described.

ROY ALEXANDER CALDWELL.

Witnesses:
C. C. CRIPPEN,
W. C. WATSON.